(12) United States Patent
Allcock et al.

(10) Patent No.: US 6,759,157 B1
(45) Date of Patent: Jul. 6, 2004

(54) PROTON CONDUCTING POLYMER MEMBRANES

(75) Inventors: Harry R. Allcock, State College, PA (US); Michael A. Hofmann, State College, PA (US); Serguei N. Lvov, State College, PA (US); Xiang Y. Zhou, State College, PA (US); Digby McDonald, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/590,985

(22) Filed: Jun. 9, 2000

Related U.S. Application Data

(60) Provisional application No. 60/138,710, filed on Jun. 11, 1999.

(51) Int. Cl.[7] ................................................ H01M 8/10
(52) U.S. Cl. .............................. 429/33; 429/41; 429/46
(58) Field of Search .............................. 429/33, 41, 46, 429/300, 305

(56) References Cited

U.S. PATENT DOCUMENTS 4,840,856 A    6/1989  Nakacho et al.
5,411,663 A    5/1995  Johnson
5,789,106 A  * 8/1998  Rosenmeier et al. ........ 429/192
6,248,469 B1 * 6/2001  Formato et al. .............. 429/41

* cited by examiner

*Primary Examiner*—Patrick Ryan
*Assistant Examiner*—Dah-Wei Yuan
(74) *Attorney, Agent, or Firm*—Patrea L. Pabst, Esq.

(57) ABSTRACT

Proton conducting membranes having improved resistance to methanol crossover are provided, along with methods for their manufacture. In a preferred embodiment, the polymeric membranes are formed by (a) dissolving a polymer, preferably a polyphosphazene, in an organic solvent to form a polymer solution; (b) adding an oxyacid to the polymer solution; (c) optionally, adding water to the polymer solution, preferably in a molar ratio equivalent to the oxyacid; (d) optionally, concentrating the polymer solution; (e) casting the polymer solution on a casting surface, such as one formed of or coated with TEFLON™; and (f) removing the organic solvent, so as to form the polymeric membrane. A particularly useful application for these polymeric membranes is in fuel cells, such as those wherein methanol and oxygen are converted into electrical energy.

13 Claims, 5 Drawing Sheets

PROTON CONDUCTING POLYMER MEMBRANES

CROSS-REFERENCE TO RELATED APPLICATIONS

Priority is claimed to U.S. provisional application Serial No. 60/138,710, filed Jun. 11, 1999.

BACKGROUND OF THE INVENTION

The present invention generally relates to proton conducting polymer membranes and methods of manufacture thereof, which are useful in methanol-based fuel cells.

Proton conducting polymer membranes, or polymer electrolyte membranes, are of general interest because such membranes can be used to conduct protons in fuel cells, which convert methanol into electrical energy and show promise as low emission power sources. Methanol-based fuel cells produce power through the electrochemical reaction of methanol and oxygen whereby oxygen is reduced at the cathode and methanol is oxidized at the anode. An appropriate polymer membrane is insoluble in water and methanol and is selectively permeable to hydrogen ions.

Fluorocarbon based resins, such as NAFION™ and its derivatives, are the most common materials used in the manufacture of solid-polymer electrolyte membranes in methanol fuel cells. The membranes are stable and conduct protons. However, the membranes are permeable to methanol and allow significant amounts of methanol to diffuse through the membrane and crossover from the anode to cathode resulting in the spontaneous oxidation of methanol at the cathode. This oxidation depletes fuel from the cell and results in a loss of energy and efficiency. In addition, NAFION™ membranes are not cost efficient because NAFION™ is an expensive starting material and the fabricated membranes become unusable upon dehydration at elevated temperatures.

It would therefore be advantageous to develop alternative membrane materials that are more resistant to methanol diffusion (and thus crossover) and which preferably are less expensive than fluorocarbon-based polymers. It would also be desirable to easily and efficiently substitute the polymer to alter, based on specific application needs, the bulk material properties of the polymer material forming the membrane.

It is therefore an object of the present invention to provide compositions for use in proton conducting membranes having enhanced methanol diffusion resistance, and methods of manufacture thereof.

It is another object of the present invention to provide proton conducting membranes having enhanced methanol diffusion resistance and improved bulk properties, preferably at a lower cost than fluorocarbon-based polymers.

SUMMARY OF THE INVENTION

Proton conducting membranes having improved resistance to methanol crossover are provided, along with methods for their manufacture. In a preferred embodiment, the polymeric membranes are formed by (a) dissolving a polymer, preferably a polyphosphazene, in an organic solvent to form a polymer solution; (b) adding an oxyacid to the polymer solution; (c) optionally, adding water to the polymer solution, preferably in a molar ratio equivalent to the oxyacid; (d) optionally, concentrating the polymer solution; (e) casting the polymer solution on a casting surface, such as one formed of or coated with TEFLON™; and (f) removing the organic solvent, such as by a controlled evaporation, so as to form the polymeric membrane.

A particularly useful application for these polymeric membranes is in fuel cells, such as those wherein methanol and oxygen are converted into electrical energy.

DETAILED DESCRIPTION OF THE INVENTION

Figure 1:
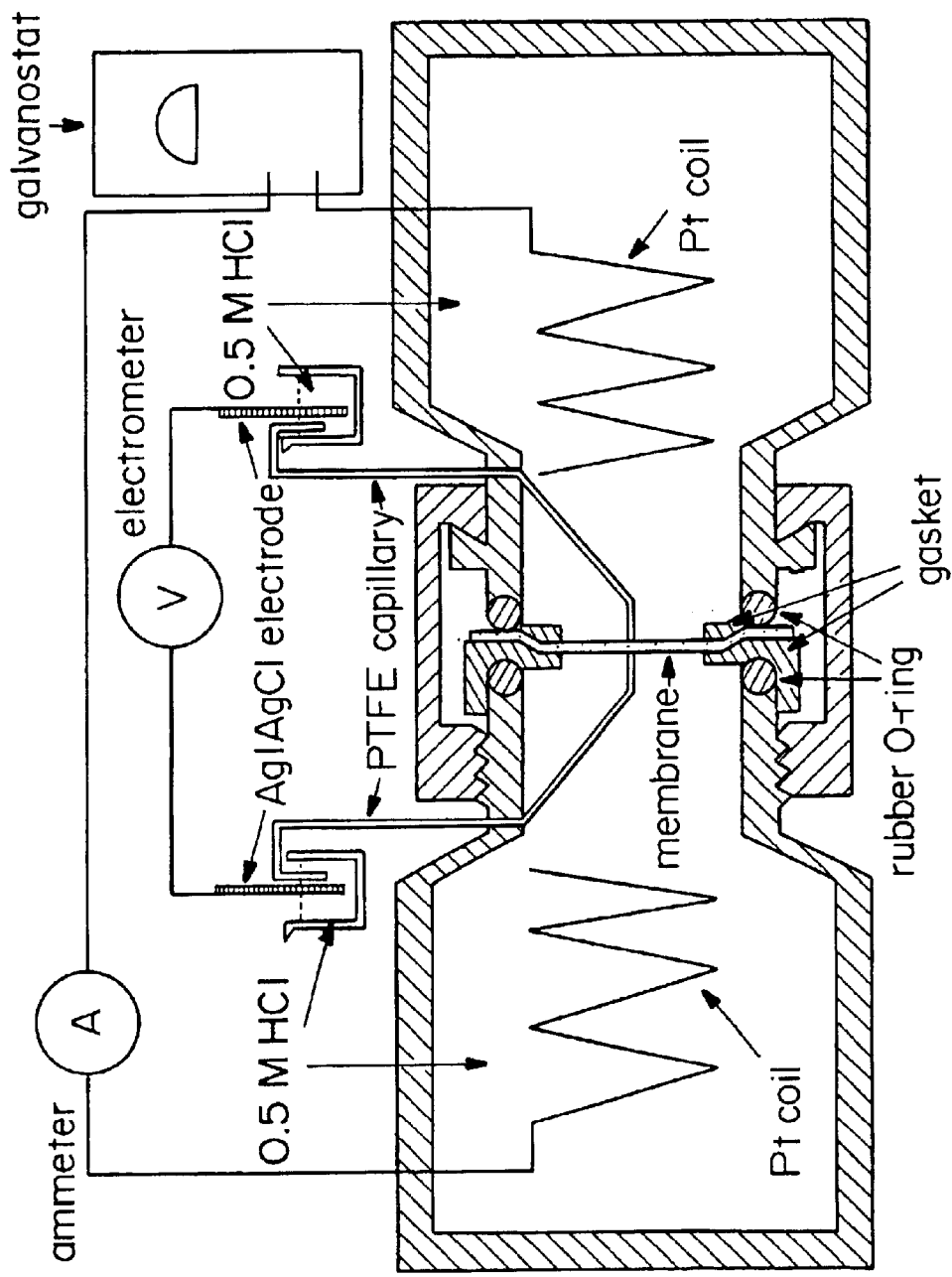
FIG. 1 is a schematic of an electrochemical cell used in the Examples to measure proton conductivity of the polymeric membranes.

Improved proton conducting polymer membranes (a/k/a polymer electrolyte membranes) have been developed, along with methods for the manufacture thereof. These proton conducting membranes exhibit excellent proton conductivity (comparable to standard commercially available membranes) and yet have increased resistance to methanol diffusion. The polymer membranes are formed by combining a polymer, an oxyacid (such as phosphorus oxyacid), and water.

I. The Polymeric Membranes

As used herein, the term "polymeric membrane" refers to proton conducting membranes. The polymeric membrane preferably has a thickness between about 0.02 and about 0.03 cm. In a preferred embodiment, the polymeric membranes exhibit, at room temperature (e.g., 20–25° C.) proton conductivities in the range of $10^{-3}$ to $10^{-2}$ S/cm, which is approximately equal to the proton conductivity of polymer electrolyte membranes standard in the fuel cell industry, such as NAFION™ 117.

The polymeric membranes preferably are more resistant to methanol diffusion than NAFION™ 117. The polymeric membranes should exhibit, at room temperature, methanol crossover rates that are at least approximately 2–5 times slower than those of NAFION™ 117. The polymeric membranes also should continue to exhibit these proton conducting and methanol crossover resistance properties even after weeks of exposure to water.

II. Membrane Materials and Processing Agents

The polymer membranes are formed by combining a polymer, an oxyacid, and optionally and preferably water.

Polymer

The polymer is a water insoluble organic polymer or a hybrid inorganic/organic polymer. The polymer can be polymerized and substituted using techniques known in the art. The polymer preferably is mechanically flexible, rather than rigid or brittle.

The preferred polymer is a polyphosphazene. Other representative polymers useful in the present polymeric membranes include polyalkenes, polyacrylics, polyvinyl ethers, polyvinylhalides, polystyrenes, polyesters, polyurethanes, and polyamides.

Polyphosphazene polymers may be substituted with one or more side group. Representative examples of side groups include alkyl, fluoralkyl, alkoxy, fluoroalkoxy, alkylamino, aryl, aryloxy, and arylamino groups. Any aryl side group may be derivatized with one or more functionality, including, for example, halo, alkyl, fluoralkyl, alkoxy, fluoroalkoxy, alkylamino, and fluoroalkylamino functionalities.

Oxyacid

Representative oxyacids suitable for use in the present polymeric membranes include boric, carbonic, cyanic, isocyanic, silicic, nitric, nitrous, phosphoric, phosphorous, hypophosphorous, arsenic, arsenious, antimonic, sulfuric, sulfurous, selenic, selenious, telluric, chromic, dichromic, perchloric, chloric, chlorous, hypochlorous, bromic, bromous, hypobromous, periodic, iodic, hypoiodous, permanganic, manganic, pertechnetic, technetic, perrhennic, rehnnic acids, and their condensation products, for example pyrophosphoric, triphosphoric, and polyphosphoric acid. The acids may be derivatized with one or more of the following groups: alkyl, fluoroalkyl, alkoxy, flouroalkoxy, alkylamino, fluoroalkylamino, aryl, aryloxy, and arylamino groups. Any aryl may be derivatized with one or more functionality, including, for example, halo, alkyl, fluoralkyl, alkoxy, fluoroalkyl, alkoxy, fluoroalkoxy, alkylamino, and fluoroalkylamino groups. A preferred oxyacid is phosphorous oxychloride.

Organic Solvent

A preferred organic solvents include tetrahydrofuran (THF). Other suitable solvents include dioxane, and N,N-dimethylformamide (DMF), as well as any solvent suitable for dissolving the polymer and miscible with the oxyacid and water.

III. Methods of Making the Polymeric Membranes

Methods are provided for synthesizing the polymeric membranes described herein. In a preferred embodiment, the polymeric membranes are formed by (a) dissolving a polymer in an organic solvent to form a polymer solution, preferably at about 1 g polymer per 200 mL solvent;

(b) adding an oxyacid to the polymer solution, preferably at about 2 molar equivalents per polymer repeat unit;

(c) optionally, adding water to the polymer solution, preferably in a molar ratio equivalent to the oxyacid;

(d) optionally, concentrating the polymer solution, e.g., by evaporating a portion of the organic solvent;

(e) casting the polymer solution on a casting surface, e.g., a TEFLON™ (polytetrafluoroethylene) coated glass slide or a TEFLON™ tray; and (f) removing the organic solvent, typically by a slow or controlled evaporation, so as to form the polymeric membrane.

The cured polymeric membrane preferably is hydrolyzed and washed by soaking in distilled water and intermittently replacing the water with fresh distilled water until the pH of the water bath remains constant. The hydrolyzed membrane then can, for example, be stored in water or incorporated, for example, into a methanol/oxygen fuel cell. Alternatively, the polymeric membrane may be dehydrated and later refluxed with water to restore is conducting function.

The polymer solution concentration of step (d) can be conducted using techniques known in the art, such as by evaporation under vacuum or using a rotavapor.

The organic solvent removal of step (f) typically must be conducted slowly, so as to avoid the formation of undesirable holes or bubbles in the membrane and the formation of a membrane which is not uniform overall. The evaporation rate can be controlled using techniques known in the art, such as by nearly saturating the vapor space above the cast solution with the organic solvent.

IV. Applications for the Polymeric Membranes

The polymeric membranes described herein are useful in a variety of applications and devices requiring proton conducting polymer membranes. A particularly useful application is in fuel cells, such as those wherein methanol and oxygen are converted into electrical energy. The polymeric membranes also may have application in hydrogen/oxygen fuel cells. The polymeric membranes may be used to increase fuel efficiency in such cells, for example, relative to NAFION™ electrolyte membranes.

Alternatively, the polymeric membranes can be incorporated into devices for use processes for the separation of organic liquids from water.

The membranes and methods described herein will be further understood with reference to the following non-limiting examples.

EXAMPLE 1

Preparation of a Proton Conducting Polyphosphazene Membrane

Poly[bis(phenoxy)polyphosphazene] was synthesized according to standard methods, and then was isolated, purified, and dried. The polymer (1 g) was dissolved in 200 mL refluxing THF (VWR) over one hour. The solution was gravity filtered and then cooled to room temperature. Phosphorous oxychloride (0.81 mL, Aldrich) then was added to the solution with stirring. Distilled water (0.16 mL) then was added to the solution with stirring. The polymer, acid, water solution was concentrated on a rotovapor until it became viscous (approx. 30 mL), and then it was poured into a TEFLON™ tray having dimensions of 6 cm in length×6 cm in width×by 1 cm in depth. The THF was allowed to slowly evaporate over about 24 hrs. After curing, the polymeric membrane was hydrolyzed by soaking in water and intermittently replacing the water with fresh distilled water until the water bath maintained a constant pH. The resultant polymer membrane was insoluble in water and methanol.

Analytical Methods

Method for Measuring Ionic Conductivity

The apparatus depicted in FIG. 1 was used to carry out the measurements of membrane conductivity. The epoxy cell consists of two compartments containing 0.5 mol kg$^{-1}$ hydrochloric acid that are separated by two VITON™ O-rings and the polymeric membrane to be measured. Two gaskets pressing on the membrane ensured no liquid connection between the compartments. One platinum electrode was placed in each compartment. In addition, two PTFE capillary (0.5 mm diameter) electrodes with 0.5 mol kg$^{-1}$ hydrochloric acid filled tips, one in each compartment, were placed on either side of the membrane and served as the salt bridges between two Ag|AgCl (saturated NaCl) reference electrodes. To minimize error, the electrodes and PTFE capillaries were identical.

Each sample membrane was measured against NAFION™ 117 membranes soaked in 0.5 mol kg$^{-1}$ hydrochloric acid before installation in the cell. The membrane resistance was measured using a digital electrochemical impedance spectroscopy system, and ionic conductivity ($\sigma$) was calculated from the measured resistance value as follows:

$$\sigma = \frac{1}{R} \times \frac{h}{S} \qquad \text{(EQ. 1)}$$

where:

R is the resistance of the membrane;

h is the membrane thickness; and

S is the area of membrane exposed to the solution.

Methanol Crossover Measurements

Figure 2:
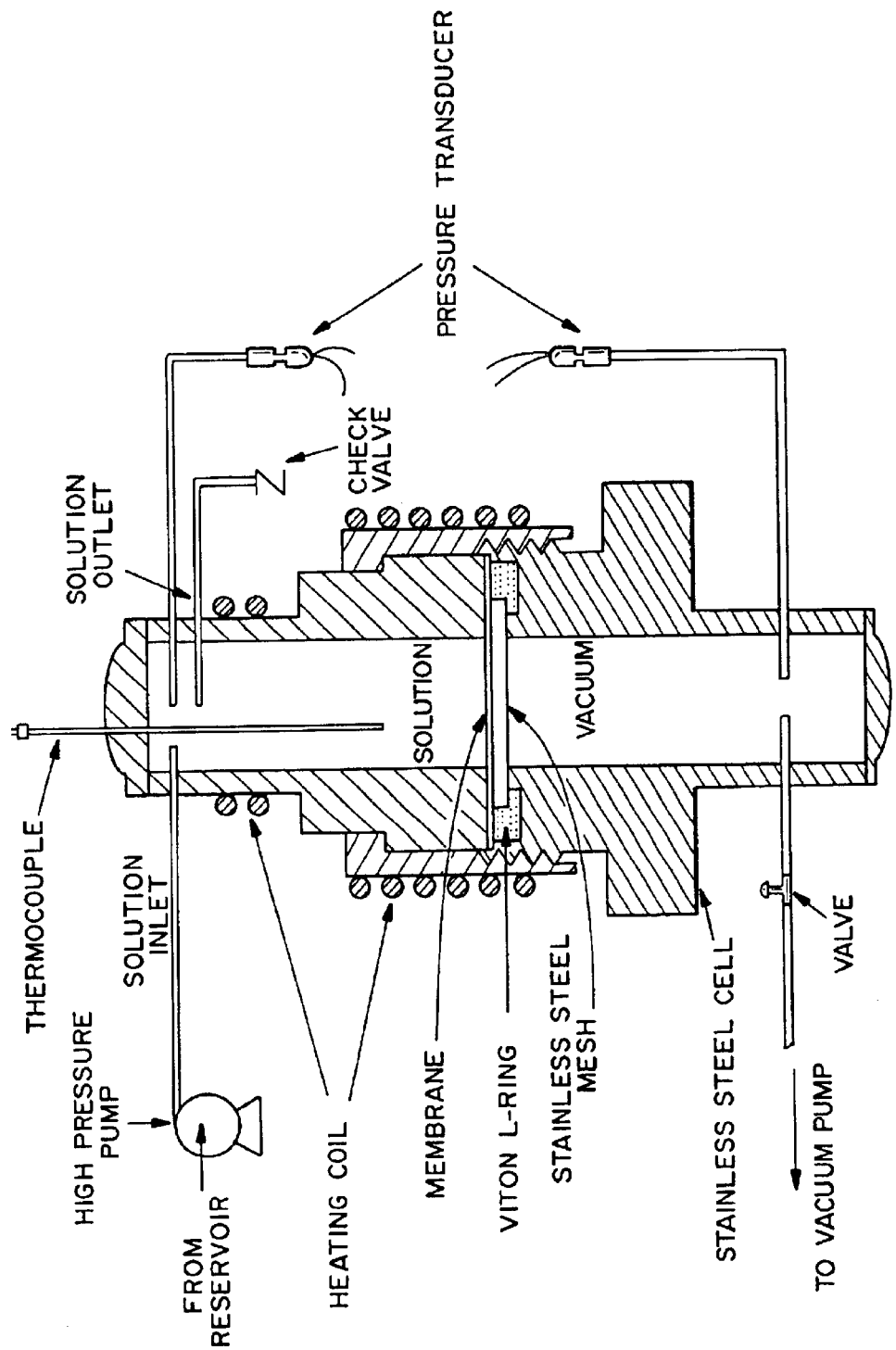
FIG. 2 is a schematic of an apparatus used in the Examples to measure methanol crossover of the polymeric membranes.

The system developed for the methanol crossover measurements is shown in FIG. 2. The cylindrical, stainless steel cell was separated into two chambers by the sample polymer membrane supported by a stainless steel or TEFLON™ mesh to prevent deformation and cracking. The upper chamber was filled with air or methanol solution while the lower chamber was evacuated using a vacuum pump. Methanol crossover rate was determined by monitoring the pressure change in the vacuum chamber due to crossover of water and methanol penetrating into the chamber through the membrane.

Prior to each experiment, the top surface of the membrane was exposed to air for approximately an hour to ensure constant pressure and a sealed vacuum chamber. An aqueous methanol solution, 10% (v/v), was then pumped into the upper chamber at a constant flow rate, 1.5 ml min$^{-1}$. Pressures in both chambers were measured using pressure transducers. For tests at elevated temperatures, the desired temperature was maintained using a tape heater and a temperature controller. A thermocouple was installed to monitor the operational temperature of the polymer membrane.

Figure 3:
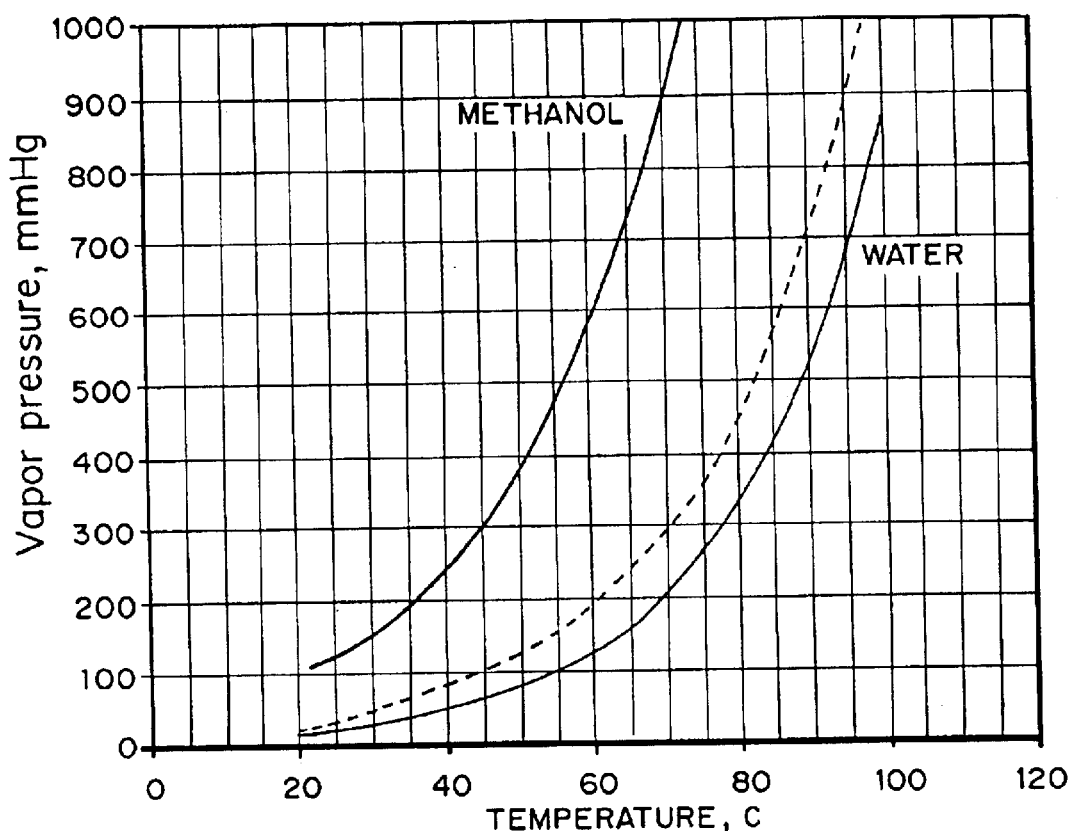
FIG. 3 is a graph showing vapor pressure (mm Hg) curves for water and methanol versus water as a function of temperature (° C.). The dashed line represents an interpolation for a 10% methanol-water (v/v) solution.

The starting pressure in the vacuum chamber should be lower than the vapor pressure of methanol and higher than that of water at the operational temperature to distinguish the methanol crossover from water crossover. Thus, water entering the vacuum chamber remained in the liquid phase resulting in negligible pressure increase. The vapor pressure vs. temperature diagrams for methanol and water in FIG. 3 were used to determine the starting pressure.

Typically stable crossover rate was evaluated within the first ten minutes immediately after the introduction of the aqueous methanol solution into the cell. Assuming that the vapor of methanol is an ideal gas, the relationship between the rate of methanol entering the vacuum chamber and the pressure increase can be expressed as:

$$\frac{dn}{dt} = \frac{V_o}{RT} \frac{dp}{dt} \qquad \text{(EQ. 2)}$$

where n is the amount of methanol vapor (in moles);

$V_o$ is the volume of the vacuum chamber, R is the gas constant; and dp/dt denotes the pressure change in the vacuum chamber as a function of time (i.e. the slope of the curve).

Methanol Diffusion Evaluation

Figure 5:
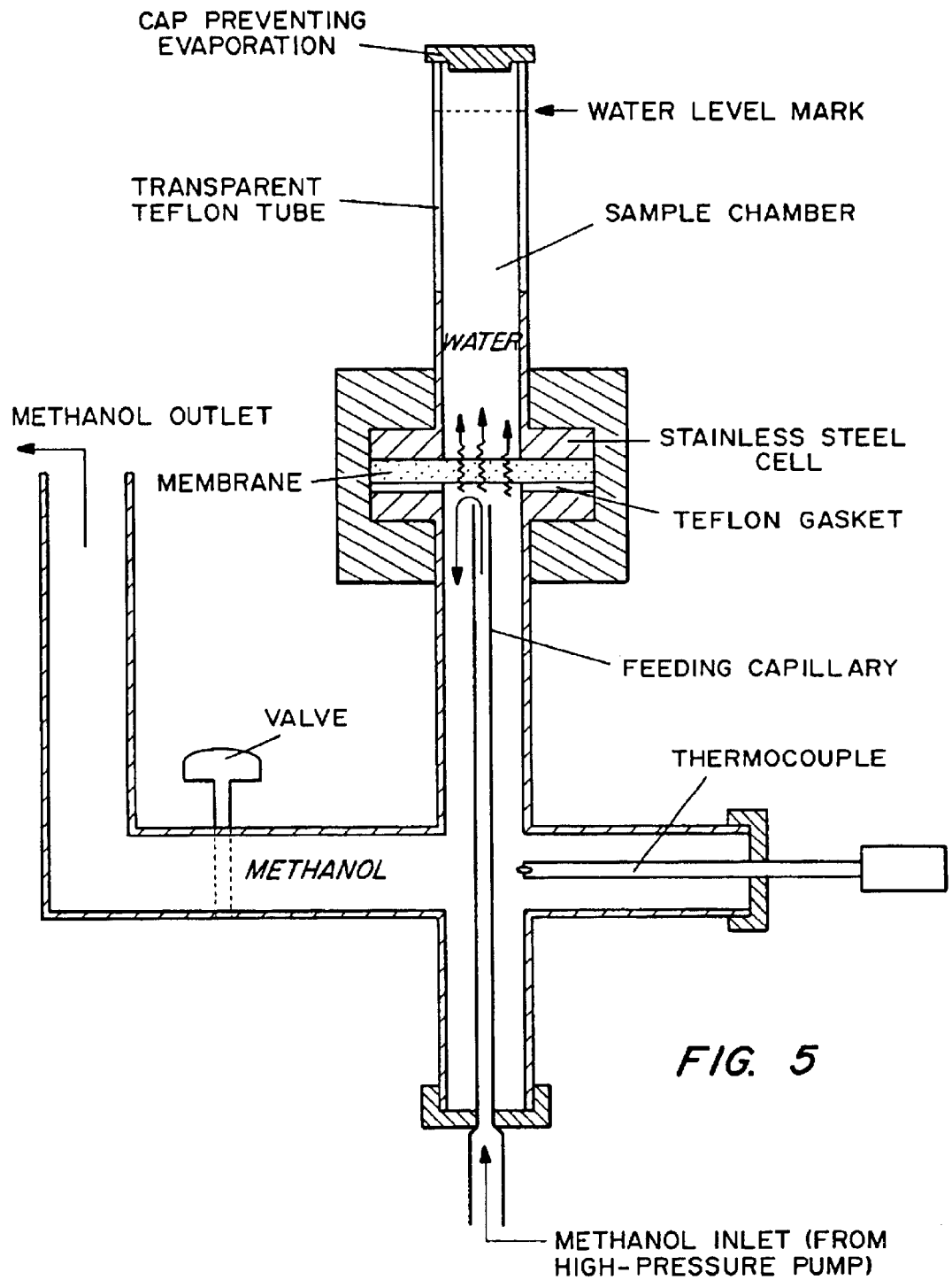
FIG. 5 is a schematic of an apparatus used in the Examples to measure methanol diffusion.

The system developed for methanol diffusion evaluation is shown in FIG. 5. The membrane was fixed in the cell in horizontal position. Through a capillary tube spaced about 0.5 mm from the membrane, a 50% methanol (by volume) aqueous solution was pumped into the lower compartment. The upper compartment was filled with fixed amount of distilled water in order to maintain equal sample volumes.

The system was maintained at constant temperature, preferably 20° C., and constant methanol flow rate, 1.2 ml/min, for specific duration, 3.5 hours. The sample solution was stirred at fixed intervals, 15-minutes in length, and the sample was removed via syringe after 3.5 hrs.

Figure 6:
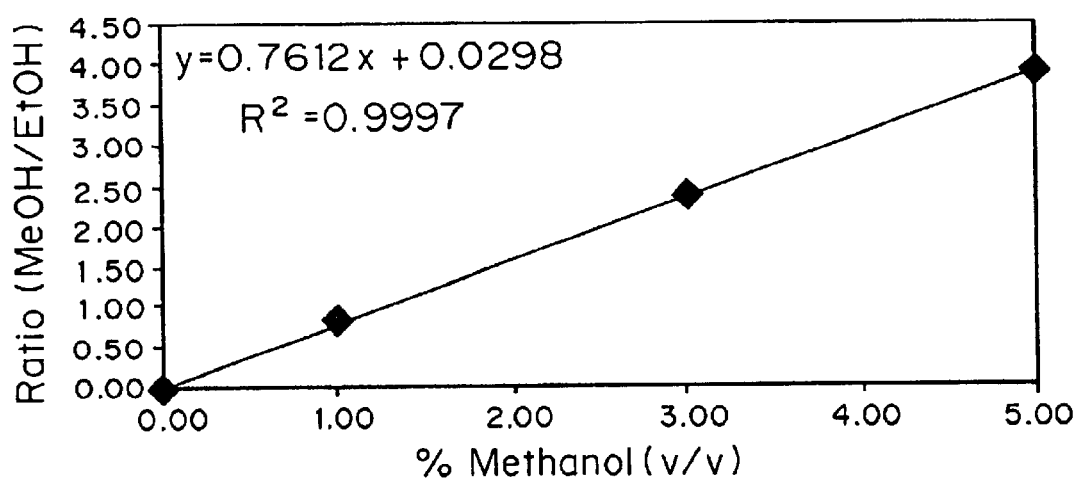
FIG. 6 is a graph of the gas chromatography calibration curve used in the Examples to determine methanol content in the diffusion analysis.

Methanol concentration of the samples was determined by gas chromatography. The calibration curve in FIG. 6 was obtained by plotting the ratio of the methanol peak area to the ethanol peak area versus methanol concentration using standards containing 1% (v/v) ethanol and varying amounts of methanol. The unknown samples from the diffusion test were each spiked with 1% ethanol and analyzed in the gas chromatograph. The ratios of the methanol peak area to ethanol peak area of the diffusion samples were then substituted into the calibration equation to determine the methanol concentration.

The following equation was used to determine the methanol diffusion coefficient (cm$^2$/s):

$$D = \frac{C(\text{sample}) \times V(\text{sample}) \times \Delta x}{A \times t \times [C(\text{methanol}) - C(\text{sample})/2]} \qquad \text{(EQ. 3)}$$

where

C (sample) is the concentration of methanol created in the water sample due to diffusion; measured analytically by GC, mol/cm$^3$;

V (sample) is the volume of analyzed sample, cm$^3$;

A is the cross section area of membrane, cm$^2$;

t is the total time of diffusion, s;

$\Delta x$ is the thickness of membrane, cm Ideally, D obtained at different t should be the same value.

In the methanol crossover measurements, an Acuflow Series high-pressure pump was used to regulate the flow rate of methanol. Pressure was measured in the chambers using pressure transducers from Omega Engineering Co., and temperature was maintained, if necessary, with an Omega CN9000A temperature controller.

The membrane resistance was measured using an EIS130 from Gamry Instruments in the ionic conductivity measurements. The methanol concentrations in the methanol diffusion analysis was measured using a gas chromatograph.

Results and Discussion

Polymer Membrane

The membranes contained about 60% water by weight. This was determined by blotting the surfaces of a membrane that was stored in water with a paper towel. The membrane was weighed and then placed under vacuum for about 24 hours (<1 mm Hg). The dry membrane was weighed again and the difference in weight was attributed to initial water weight.

The membranes were white in color, with dimensions slightly smaller than that of the TEFLON™ tray. Typically the outer 0.25 cm of the membranes were trimmed off with a pair of scissors. The membranes typically were 0.02 to 0.03 cm in thickness. The membranes were slightly elastic, not brittle, and will stretch significantly if pulled before breaking.

Ionic Conductivity Measurements

Each sample membrane was measured against NAFION™ 117 membranes soaked in 0.5 mol kg$^{-1}$ hydrochloric acid before installation in the four-electrode cell. The conductivity values of the polyphosphazene membrane and NAFION™ 117 are shown in Table 1.

TABLE 1

Conductivities of Polyphosphazene and NAFION ™ Membranes at 25° C.

| Membrane | Ionic conductivity (S/cm) |
|---|---|
| Poly(aryloxy)phosphazene membrane | $2.8 \times 10^{-3}$ |
| NAFION ™ 117 | $2.7 \times 10^{-3}$ |

The conductivities for the polyphosphazene membrane and NAFION™ 117 were approximately the same.

Methanol Crossover Rates

Figure 4:
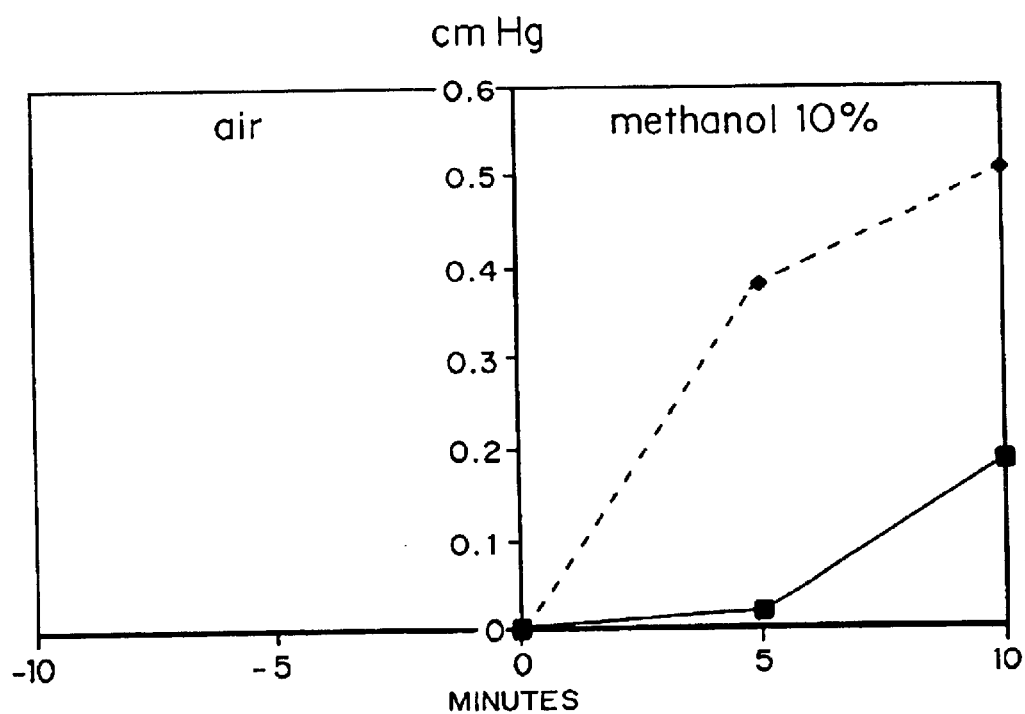
FIG. 4 is a graph showing methanol crossover (cm-Hg) versus time (minutes), comparing a polyphosphazene membrane (solid line) with a NAFION™ 117 membrane (dashed line).

As can be seen from FIG. 4, the polyphosphazene membrane (0.02 cm Hg/minute) was 2–5 times more resistant to methanol permeation than the NAFION™ membrane (0.05 cm Hg/minute).

Methanol Diffusion Analysis

The methanol diffusion coefficients for the polyphosphazene membrane and NAFION™ are shown in Table 2.

TABLE 2

Membrane Diffusion Coefficients For 50% MeOH/water solution at 25° C.

| Membrane | Thickness (cm) | Diffusion Coefficient ($10^{-6}$ cm$^2$/s) |
|---|---|---|
| MAH 6-40 | 0.027 | 0.23 |
| MAH 6-40 | 0.027 | 0.27 |
| MAH 6-40 | 0.027 | 0.23 |
| NAFION ™ 117 | 0.023 | 1.12 |
| NAFION ™ 117 | 0.023 | 1.41 |
| NAFION ™ 117 | 0.023 | 1.71 |
| NAFION ™ 117 | 0.023 | 2.02 |
| NAFION ™ 117 | 0.023 | 1.49 |

Again, the polyphosphazene membrane showed superior resistance to methanol diffusion, as NAFION™ exhibited a diffusion coefficient about 4–8 times greater than the coefficient of the polyphosphazene membrane.

Modifications and variations of the present invention will be obvious to those of skill in the art from the foregoing detailed description. Such modifications and variations are intended to come within the scope of the following claims.

We claim:

1. A method for making a proton conducting polymeric membrane, comprising dissolving a polymer in an organic solvent to form a polymer solution;

adding an oxyacid to the polymer solution;

casting the oxyacid-containing polymer solution onto a casting surface; and removing the organic solvent so as to form a proton conducting polymeric membrane, wherein the oxyacid is selected from the group consisting of boric, carbonic, cyanic, isocyanic, silicic, nitric, nitrous, phosphoric, phosphorous, hypophosphorous, arsenic, arsenious, antimonic, sulfuric, sulfurous, selenic, selenious, telluric, chromic, dichromic, perchloric, chloric, chlorous, hypochlorous, bromic, bromous, hypobromous, periodic, iodic, hypoiodous, permanganic, manganic, pertechnetic, technetic, perrhennic, rehnnic acids, and their condensation products and optionally bears one or more groups selected from the group consisting of alkyl, fluoroalkyl, alkoxy, flouroalkoxy, alkylamino, fluoroalkylamino, aryl, aryloxy, and arylamino groups, and wherein the aryl, aryloxy or arylamino groups optionally bear one or more functionality selected from the group consisting of halo, alkyl, fluoroalkyl, alkoxy, fluoroalkoxy, alkylamino, and fluoroalkylamino groups.

2. The method of claim 1 further comprising adding water to the oxyacid-containing polymer solution in a molar ratio equivalent to the oxyacid.

3. The method of claim 1 further comprising concentrating the oxyacid-containing polymer solution prior to casting the oxyacid-containing polymer solution onto the casting surface.

4. The method of claim 1 wherein the polymer is selected from polyphosphazenes, polyalkenes, polyacrylics, polyvinyl ethers, polyvinylhalides, polystyrenes, polyesters, polyurethanes, and polyamides.

5. The method of claim 1 wherein the organic solvent is tetrahydrofuran.

6. The method of claim 1 wherein the oxyacid is selected from boric, carbonic, cyanic, isocyanic, silicic, nitric, nitrous, phosphoric, phosphorous, hypophosphorous, arsenic, arsenious, antimonic, sulfuric, sulfurous, selenic, selenious, telluric, chromic, dichromic, perchloric, chloric, chlorous, hypochlorous, bromic, bromous, hypobromous, periodic, iodic, hypoiodous, permanganic, manganic, pertechnetic, technetic, perrhennic, rehnnic acids, and their condensation products.

7. The method of claim 1 wherein the casting surface is formed of or coated with polytetrafluoroethylene.

8. The method of claim 1 wherein the organic solvent is removed by evaporation.

9. A proton conducting polymeric membrane made by a method comprising dissolving a polymer in an organic solvent to form a polymer solution;

adding an oxyacid to the polymer solution;

casting the oxyacid-containing polymer solution onto a casting surface; and removing the organic solvent so as to form a proton conducting polymeric membrane, wherein the oxyacid is selected from the group consisting of boric, carbonic, cyanic, isocyanic, silicic, nitric, nitrous, phosphoric, phosphorous, hypophosphorous, arsenic, arsenious, antimonic, sulfuric, sulfurous, selenic, selenious, telluric, chromic, dichromic, perchloric, chloric, chlorous, hypochlorous, bromic, bromous, hypobromous, periodic, iodic, hypoiodous, permanganic, manganic, pertechnetic, technetic, perrhennic, rehnnic acids, and their condensation products and optionally bears one or more groups selected from the group consisting of alkyl, fluoroalkyl, alkoxy, flouroalkoxy, alkylamino, fluoroalkylamino, aryl, aryloxy, and arylamino groups, and wherein the aryl, aryloxy or arylamino groups optionally bear one or more functionality selected from the group consisting of halo, alkyl, fluoroalkyl, alkoxy, fluoroalkoxy, alkylamino, and fluoroalkylamino groups.

10. A fuel cell comprising a proton conducting polymeric membrane made by a method comprising dissolving a polymer in an organic solvent to form a polymer solution;

adding an oxyacid to the polymer solution;

casting the oxyacid-containing polymer solution onto a casting surface; and removing the organic solvent so as to form a proton conducting polymeric membrane, wherein the oxyacid is selected from the group consisting of boric, carbonic, cyanic, isocyanic, silicic, nitric, nitrous, phosphoric, phosphorous, hypophosphorous, arsenic, arsenious, antimonic, sulfuric, sulfurous, selenic, selenious, telluric, chromic, dichromic, perchloric, chloric, chlorous, hypochlorous, bromic, bromous, hypobromous, periodic, iodic, hypoiodous, permanganic, manganic, pertechnetic, technetic, perrhennic, rehnnic acids, and their condensation products and optionally bears one or more groups selected from the group consisting of alkyl, fluoroalkyl, alkoxy, flouroalkoxy, alkylamino, fluoroalkylamino, aryl, aryloxy, and arylamino groups, and wherein the aryl, aryloxy or arylamino groups optionally bear one or more functionality selected from the group consisting of halo, alkyl, fluoroalkyl, alkoxy, fluoroalkoxy, alkylamino, and fluoroalkylamino groups.

11. A method for making a proton conducting polymeric membrane, comprising dissolving a polymer in an organic solvent to form a polymer solution;

adding an oxyacid to the polymer solution;

casting the oxyacid-containing polymer solution onto a casting surface; and removing the organic solvent so as to form a proton conducting polymeric membrane, wherein the polymer is a polyphosphazene.

12. The method of claim 11 wherein the oxyacid is phosphorous oxychloride.

13. A proton conducting polymeric membrane comprising a mixture of a polyphosphazene and a oxyacid.

* * * * *

UNITED STATES PATENT AND TRADEMARK OFFICE
CERTIFICATE OF CORRECTION

PATENT NO. : 6,759,157 B1  Page 1 of 1
DATED : July 6, 2004
INVENTOR(S) : Harry R. Allcock It is certified that error appears in the above-identified patent and that said Letters Patent is hereby corrected as shown below:

<u>Column 1,</u>
Line 8, insert -- The U.S. government has certain rights in the invention since the invention was made with support from the Government under DOE Grant No. FCO2-98EE50537. --.

Signed and Sealed this

Second Day of May, 2006

JON W. DUDAS
*Director of the United States Patent and Trademark Office*